Oct. 30, 1951  E. WALTERS  2,573,235
SETTING TOOL
Filed April 7, 1945
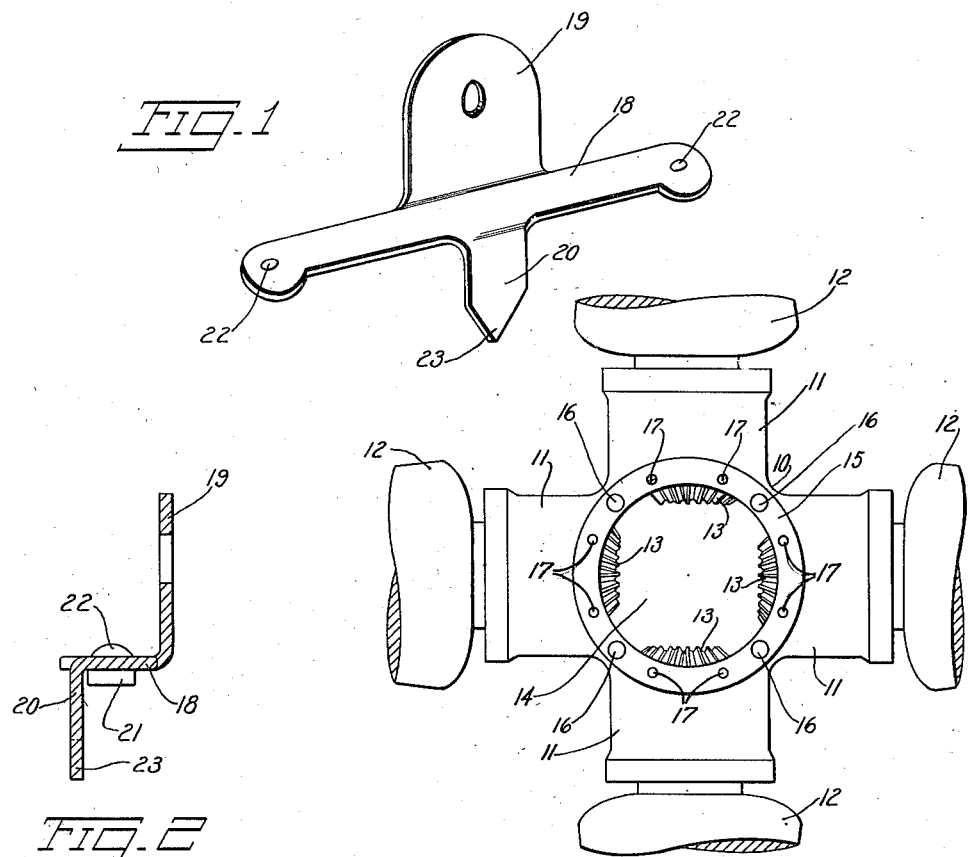
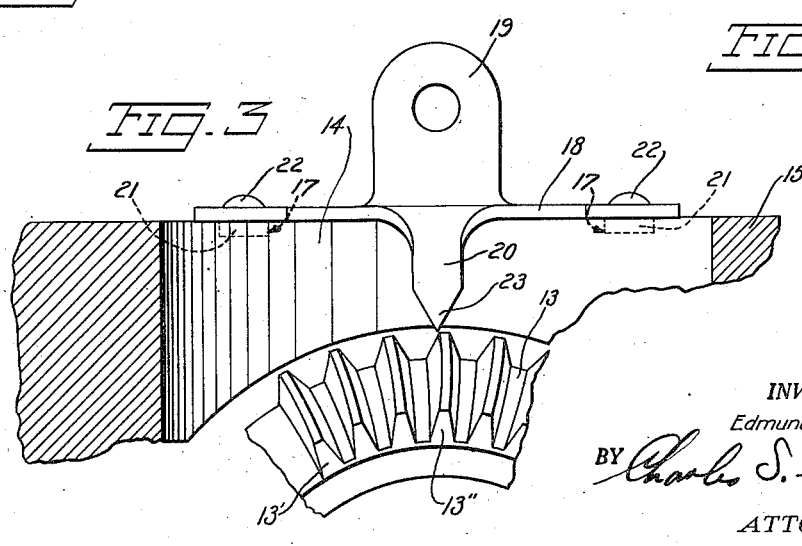
INVENTOR.
Edmund Walters
BY Charles S. Wilson
ATTORNEY.

Patented Oct. 30, 1951

2,573,235

UNITED STATES PATENT OFFICE 2,573,235

SETTING TOOL

Edmund Walters, Evansville, Ind., assignor to Republic Aviation Corporation, Farmingdale, N. Y., a corporation of Delaware Application April 7, 1945, Serial No. 587,180

10 Claims. (Cl. 116—114)

This invention relates to setting tools and has for its object the provision of a device for individually setting and coordinating the positions of a plurality of gears or gear sections to the end that they may simultaneously mesh with a single cooperating gear in an assembling operation.

While the instant invention is of general application and use in the control and regulation of the positions of gears and gear sections, it is especially designed for the positioning and coordinating of the gear sections coacting with and controlling the positions of the multiple blades of variable pitch propellers to accomplish the simultaneous meshing of the teeth of all of said gear sections with the teeth of the single gear of the power unit when the latter is mounted or assembled on the propeller hub.

With the above and other objects in view, as will be apparent, this invention consists in the construction, combination and arrangement of parts all as hereinafter more fully described, claimed and illustrated in the accompanying drawings, wherein:

Fig. 1 is a perspective view of a setting tool constructed in accordance with the teachings of the present invention;

Fig. 2 is a central vertical or transverse section through the tool;

Fig. 3 is a fragmentary section taken through the hub of a propeller to illustrate the present tool in cooperation with one of the gear sections housed therein; and Fig. 4 is a front elevation of a propeller hub illustrating the several gear sections of the multiple propeller blades and their relative positions within the housing, as well as that portion of the hub with which the instant tool is designed to cooperate.

In aircraft the propellers usually consist of two or more blades mounted on a hub. Where variable pitch blades are used each blade is mounted for limited rotary adjustment and for that purpose has a gear section fixed to its inner end and positioned or housed within the hub of the propeller, all of said gear sections cooperating with the gear or gears of a power unit mounted upon and affixed to said hub. In the assembly and servicing of multiple blade, variable pitch propellers, difficulty has been experienced in so positioning all of the gears or gear sections of the several blades that their teeth will readily, easily and simultaneously mesh with the teeth of the gear of the power unit when the same is mounted upon and attached to the hub. This difficulty of assembly has not only consumed unreasonable time and man hours, but has frequently entailed damage to the teeth of the gear sections and gears. The present invention is designed to provide a tool by which each gear section may be individually adjusted and positioned prior to the attachment of the power unit so that the gear of the power unit will simultaneously mesh with the teeth of all of the propeller gears or gear sections immediately upon the insertion thereof into the gear housing of the hub of the propeller.

In Fig. 4 of the drawing is shown the hub 10 of a propeller having the radiating bearings 11, each of which carries and mounts a propeller blade 12 for limited rotary adjustment therein. Each propeller blade 12 has a stub shaft (not shown) passing through the bearing 11 and terminating at its inner end within the housing 14 of the hub 10, where it is provided with a gear or gear section 13. If the propeller has three blades there are three gear sections 13 within the housing 14 of the hub 10, and if there are four blades, as here illustrated, there will be four gear sections 13 within said housing.

The housing 14 is provided with a central boss 15 having a plane or flat outer face upon which the power unit (not shown) is mounted. This power unit is secured in place on the boss 15 by mounting bolts which enter and are secured in apertures 16 spaced at appropriate intervals in the face of said boss 15. In standard propeller hubs a pair of holes or depressions 17 are usually provided in the outer face of the bushing 15 symmetrical to the longitudinal axis of each blade 12 and its gear section 13. The original purpose and utility of these holes or depressions 17, provided in the outer face of the boss 15, has no relation to the present invention, which, however utilizes them in the individual determination of the adjusted position of each gear section 13.

The foregoing described the propeller hub and associated mechanism to be adjusted and coordinated by the present setting tool and while an understanding thereof is desirable to an appreciation of the utility of this tool it forms no part of the present invention and is not to be considered as a limitation of the utility or structure of the tool or of the scope of the claims hereof. Manifestly the construction of the hub, the propeller blades and associated mechanisms may be widely varied without entailing more than minor changes in the tool structure and of its size and dimensions.

The present invention comprises a relatively flat narrow plate 18, having an upstanding integral handle 19 at one of its longitudinal edges centrally between its ends and an opposed integral pointer or indicator 20 projecting in the opposite direction from the longitudinal edge of the plate opposed to the handle 19. The handle 19 and the pointer or indicator 20 are disposed at opposite edges of the plate 18 and extend therefrom in opposite directions but in parallel planes.

At each of its ends and equidistant from the center of the pointer or indicator 20, the plate 18 is provided with a stud 21 fixed to the end portion of the plate by a rivet 22 which passes through the plate and is headed or upset against the upper or outer surface thereof. These studs 21 project below the inner or lower surface of the plate 18 in the direction of the pointer or indicator 20 and are so positioned that the operating extremity of the latter is situated midway between the centers of said studs.

The position of each stud 21 with respect to the pointer or indicator 20 is such that when the plate 18 is positioned to rest flush upon the outer surface of the boss 15, the studs will exactly fit into the holes or depressions 17 of the boss, as illustrated in Fig. 3, and the pointer or indicator 20 will project into the housing 14 above the adjacent gear section 13 in alignment with the center axis of the bearing 11. When so positioned the pointer or indicator 20 will rest substantially parallel to the inner face of the wall of the housing 14 and in close proximity thereto.

The adjacent gear section 13 may then be rotated until the proper adjustment thereof with respect to the pointer or indicator 20 has been attained, after which the process and the same adjustment may be repeated with respect to each bearing 11 and its coacting propeller blade 12 and gear section 13. Thus all of the gear sections 13 will be individually adjusted to the same corresponding positions within the housing 14 to the end that the installation of the gear of the power unit into the housing 14 will result in a proper and simultaneous meshing of the teeth of the gear of the power unit and with teeth of all of the several gear sections 13 in the housing.

In adjusting and coordinating the gears or gear sections 13 of an assembly such as herein illustrated and described by way of example, the present tool is positioned with its plate 18 flush against the face of the boss 15 and its studs 21 seated in a companion pair of depressions or holes 17. The pointer or indicator 20 then is situated in cooperation with the gear or gear section 13 associated with that pair of holes or depressions, whereupon the gear or gear section may be rotated until the leading edge of the fourth tooth 13'', counting from the leading tooth 13', is aligned with the indicator or pointer 20. Each gear or gear section 13 is similarly and individually adjusted with the result that the positions of all of them are so coordinated that when any cooperating gear, such as the gear of a power unit, is positioned within the housing 14, its teeth will instantly and simultaneously mesh with the teeth of the several gear sections 13 without any further adjustment or regulation.

It is, of course, to be understood that while the present invention is described in connection with a multiple blade, variable pitch propeller of an aircraft, the present tool by obvious modifications and changes in design may be used for coordinating the positions of a multiplicity of gears for any purpose and in any mechanism without departing from the spirit and scope hereof.

What is claimed is:

1. A setting tool comprising an elongated plate, an indicator formed integrally with and centrally of the length of said plate to project angularly from one longitudinal edge thereof, studs fixed to said plate on opposite sides of and equidistant from the indicator to project from the plate in the same direction as the indicator, and a handle formed integrally with said plate to project angularly therefrom at the other longitudinal edge thereof in a direction opposite to that of the indicator but in a plane substantially parallel to the plane of said indicator.

2. A setting tool comprising a relatively narrow plate, a pair of parallel spaced studs fixed to and projecting from one face of the plate, an indicator integral with one longitudinal edge of the plate and positioned centrally between and extending in the same direction as said studs, and a handle integral with the other longitudinal edge of the plate and projecting therefrom in opposition to said indicator.

3. A tool comprising a plate, spaced parallel studs secured to said plate to project from one face thereof, and an indicater projecting from the plate in the same direction as said studs.

4. A tool comprising a plate, spaced, parallel studs secured to said plate and projecting outwardly from the plane of one face thereof, and an indicator fixed to said plate centrally between said studs to project therefrom in the same direction as the studs.

5. A tool comprising a plate, spaced, parallel studs secured to said plate and projecting outwardly from the plane of one face thereof, and an indicator fixed to said plate centrally between said studs to project therefrom in the same direction as, and parallel to, the studs 6. A tool for setting blade gears of variable pitch propellers to simultaneously receive and mesh with a common power unit gear, comprising a relatively narrow flat body having a stud on each end thereof projecting perpendicularly therefrom to engage a fixed structure housing said gears, and a pointer integral with said body medially of and extending in the same direction as the studs to terminate adjacent one of the blade gears and thereby establish a point to which the associated gear may be set.

7. A setting tool for determining the axial position of each of a plurality of blade gears within the hub of a variable pitch propeller to simultaneously receive and mesh with a common power unit gear, wherein said hub has a set of holes adjacent to each blade gear, comprising a body having a pointer extending substantially perpendicularly thereof, and studs fastened to the body to seat in a set of holes in the propeller hub for locating the pointer to terminate adjacent the teeth of a blade gear.

8. The method of individually and identically setting each of a plurality of independent gears mounted within a fixed housing consisting in successively attaching an indicator to the housing in a position normal to the axis of each gear, and then rotating each gear about its axis relative to the associated indicator until the same preselected tooth of each gear is aligned with said indicator.

9. The method of individually and identically setting each of a plurality of independent gear sections mounted within a hub structure consisting of successively positioning an indicator at predetermined points on said hub structure normal to the axis of each associated gear section and with its point in close proximity to the periphery of said gear section and then rotating each gear section while associated with the indicator until the same selected tooth of each section is aligned with the indicator point.

10. The method of adjusting each of a plurality of blade gears of a variable pitch propeller having a set of holes in the propeller hub adjacent each of said gears and symmetrical relative to the axis of each gear, consisting in positioning an indicator centrally of said holes with its point terminating at the periphery of the adjacent gear, and rotating each gear while associated with the indicator until a selected tooth thereof is in alignment with the indicator point.

EDMUND WALTERS.

REFERENCES CITED

The following references are of record in the file of this patent:

UNITED STATES PATENTS

| Number | Name | Date |
| --- | --- | --- |
| 623,712 | Gustof | Apr. 25, 1899 |
| 888,826 | Kooken | May 26, 1908 |
| 1,359,356 | Gerstein | Nov. 16, 1920 |
| 1,463,269 | Johnson | July 31, 1923 |
| 1,503,609 | Smith | Aug. 5, 1924 |
| 1,663,983 | Hopgood | Mar. 27, 1928 |
| 1,775,563 | Kneip | Sept. 9, 1930 |
| 2,003,556 | Saballus | June 4, 1935 |
| 2,120,113 | Novey et al. | June 7, 1938 |
| 2,218,048 | Meyer | Oct. 15, 1940 |

OTHER REFERENCES

Instruction Manual for Curtiss Electric Propellers, Section 15. Copyright 1942. Curtiss-Wright Corp., Propeller Division, Caldwell, New Jersey.